US008756448B2

(12) United States Patent
Kim

(10) Patent No.: US 8,756,448 B2
(45) Date of Patent: *Jun. 17, 2014

(54) COMPUTER SYSTEM AND CONTROL METHOD THEREOF

(75) Inventor: Kwang-hyun Kim, Incheon (KR)

(73) Assignee: SAMSUNG Electronics Co., Ltd., Suwon-Si (KR)

( * ) Notice: Subject to any disclaimer, the term of this patent is extended or adjusted under 35 U.S.C. 154(b) by 302 days.

This patent is subject to a terminal disclaimer.

(21) Appl. No.: 13/223,516

(22) Filed: Sep. 1, 2011

(65) Prior Publication Data
US 2011/0314316 A1    Dec. 22, 2011

Related U.S. Application Data

(63) Continuation of application No. 11/758,234, filed on Jun. 5, 2007, now Pat. No. 8,032,773.

(30) Foreign Application Priority Data

Oct. 20, 2006 (KR) .............................. 2006-102437

(51) Int. Cl.
G06F 1/32    (2006.01)
(52) U.S. Cl.
USPC ........................... 713/323; 713/321; 713/324
(58) Field of Classification Search
USPC ......................................... 713/323, 324, 321
See application file for complete search history.

(56) References Cited

U.S. PATENT DOCUMENTS

| 5,446,906 A | 8/1995 | Kardach et al. |
| 6,462,437 B1 | 10/2002 | Marmaropoulos et al. |
| 6,654,896 B1 * | 11/2003 | Saunders et al. ............... 713/323 |
| 7,230,933 B2 | 6/2007 | Bahl et al. |

FOREIGN PATENT DOCUMENTS

| JP | 2001-222346 | 8/2001 |
| JP | 2003-345477 | 12/2003 |
| KR | 10-2001-0089829 | 10/2001 |
| KR | 2005-233 | 1/2005 |
| KR | 2005-79695 | 8/2005 |
| KR | 2006-57744 | 5/2006 |

OTHER PUBLICATIONS

Korean Office Action issued Dec. 21, 2010 in KR Application No. 2006-0102437.
Korean Notice of Allowance dated Jun. 28, 2012 issued in KR Application No. 10-2006-0102437.

* cited by examiner

Primary Examiner — Thuan Du
(74) Attorney, Agent, or Firm — Stanzione & Kim, LLP

(57) ABSTRACT

A computer system including at least one wake-up unit to sense whether a wake-up event occurs in a standby mode to decrease power consumption, a power supplying unit to supply power to the at least one wake-up unit, and a controlling unit to control a power supplying unit to the at least one wake-up unit in the standby mode according to predetermined setting corresponding to whether the at least one wake-up unit is operable.

8 Claims, 4 Drawing Sheets

COMPUTER SYSTEM AND CONTROL METHOD THEREOF

CROSS-REFERENCE TO RELATED APPLICATIONS

This application is a Continuation Application of prior application Ser. No. 11/758,234, filed on Jun. 5, 2007 now U.S. Pat. No. 8,032,773 in the United States Patent and Trademark Office, which claims priority under 35 U.S.C. §119(a) from Korean Patent Application No. 2006-0102437, filed on Oct. 20, 2006 in the Korean Intellectual Property Office, the disclosure of which is incorporated in its entirety herein by reference.

BACKGROUND OF THE INVENTION

1. Field of the Invention

The present general inventive concept relates to a computer system and a control method thereof, and more particularly to a computer system and a control method thereof which returns to a normal mode by a wake-up unit in a standby mode.

2. Description of the Related Art

Generally, a computer system restricts power supply to a predetermined device in a predetermined condition to minimize power consumption. Details regarding such power management are described in an Advanced Configuration and Power Interface (ACPI) specification that is an open industry specification co-developed by several companies. Hereinafter, "standby mode" refers to a mode where a power supply is cut off to a predetermined device to minimize power consumption. According to the ACPI specification, the standby mode may be an S1 state to S3 state.

An operating system (OS) of a computer system such as Microsoft Windows enables a user to set a power management environment for each device through a so-called 'device manager'. Accordingly, the device monitors whether a wake-up event occurs in the standby mode and transmits a monitoring result to its system. Hereinafter, the device is also called a "wake-up device". The wake-up device may include a keyboard, a mouse, a network card, an audio card, a modem, and other conventional devices.

FIG. 1 is a flow diagram to illustrate a standby mode setting and operation in a conventional computer system.

Referring to FIG. 1, a user may set through a 'device manager' whether to operate each wake-up device in the standby mode at operation S11. For example, if the wake-up device is the mouse, in the Microsoft Windows, a user may select 'pull the computer out of standby mode with this device' in 'device manager'→'mouse register information'→'power management' to set the mouse to perform an operation in the standby mode (hereinafter, "wake-up device user setting" or "user setting").

Then, the OS of the computer system confirms if it enters the standby mode during normal operation (hereinafter, also called "normal mode") at operation S12. If a condition for entering into the standby mode is satisfied at operation S12, the OS of the computer system confirms the wake-up device user setting before entering into the standby mode at operation S13, and performs environment setting of the wake-up device (hereinafter, also called "system setting") by which a predetermined wake-up device is set to be operable in the standby mode at S14. If the environment setting of the wake-up device is completed, the OS of the computer system controls the system to enter into the standby mode at operation S15. In the standby mode, the wake-up device which has been set to be operable monitors if a corresponding wake-up event occurs at operation S16, and informs the system of the occurrence of the wake-up event when the wake-up event occurs. Accordingly, the OS of the computer system restores the system to a state that existed before the standby mode was entered into and to be operable in the normal mode at operation S17.

However, according to the conventional computer system, the power supply supplying power to the wake-up device is performed in the standby mode irrespective of an actual operation of the wake-up device. Therefore, although a certain wake-up device is set not to be operable in the standby mode by the user, a standby power is always supplied to the wake-up device in the standby mode, thereby causing wasteful power consumption.

SUMMARY OF THE INVENTION

The present general inventive concept provides a computer system and a control method thereof which can minimize wasteful power consumption in a standby mode, that is, which can automatically control a power supply to a wake-up device capable of restoring the computer system from the standby mode according to the user's intention so that wasteful power consumption can be decreased or eliminated.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a computer system to decrease power consumption, the computer system comprising at least one wake-up unit to sense if a wake-up event occurs in a standby mode, a power supplying unit to supply power to the at least one wake-up unit, and a controlling unit to control the power supplying unit corresponding to the at least one wake-up unit in the standby mode according to a predetermined setting corresponding to whether the a least one wake-up unit is in an operable state.

The computer system may also comprise a user inputting unit, wherein whether the at least one wake-up unit is in the operable state is determined by a user's input through the user inputting unit.

The controlling unit may comprise an operating system (OS) which performs an operation setting of the at least one wake-up unit of the standby mode according to an advanced configuration and power interface (ACPI) specification, and a basic input/output system (BIOS) which controls the power supply to the at least one wake-up unit according to the operation setting of the at least one wake-up unit which is performed by the OS.

The computer system may also comprise a CPU where the OS and the BIOS are executed, and an interrupt generating unit which generates an interrupt to the CPU after the operation setting of the at least one wake-up unit performed by the OS, wherein the BIOS controls the power supply to the at least one wake-up unit if the interrupt is generated by the interrupt generating unit.

The computer system may also comprise a switching unit to selectively switch the power from the power supplying unit to the at least one wake-up unit, wherein the controlling unit controls the power supplying unit to supply power to the at least one wake-up unit by controlling the switching unit.

The foregoing and/or other aspects of the present general inventive concept can be achieved by providing a control method of computer system comprising at least one wake-up unit to sense whether a wake-up event occurs in a standby mode to decrease power consumption, and a power supplying unit to supply power to the at least one wake-up unit, the method comprising: performing a setting corresponding to whether to operate the at least one wake-up unit in the standby mode, and controlling the power supplying unit to supply power to the at least one wake-up unit in the standby mode according to the setting corresponding to whether to operate the at least one wake-up unit in the standby mode.

The performing of the setting may be performed by a user's input.

The control method of a computer system may also comprise performing an operation setting of the at least one wake-up unit according to an advanced configuration and power interface (ACPI) specification and generating an interrupt after the performed operation setting of the at least one wake-up unit, wherein the controlling the power supplying unit is performed when the interrupt is generated.

The foregoing and/or other aspects and utilities of the present general inventive concept may also be achieve by providing a computer apparatus usable with a power supplying unit, the apparatus including at least one wake-up unit to detect whether a wake-up event occurs in a standby mode, and a controlling unit to control the power supplying unit to supply power to the at least one wake-up unit in the standby mode based on a predetermined setting corresponding to operability of the at least one wake-up unit in the standby mode.

The foregoing and/or other aspects and utilities of the present general inventive concept may also be achieve by providing a method of reducing power consumption in a computer system, the method including performing a setting of at least one wake-up unit corresponding to operability of the at least one wake-up unit to detect a wake-up event in the standby mode, and controlling a power supplying unit to supply power to the at least one wake-up unit in the standby mode based on to the performed setting to the at least one wake-up unit.

The foregoing and/or other aspects and utilities of the present general inventive concept may also be achieve by providing a method to control power to a plurality of wake-up units of a computer apparatus, the method including determining whether a basic input/output system (BIOS) trap is set, generating a system management interrupt if the BIOS trap is set, determining which of the plurality of wake-up units are predetermined to be operable in a standby mode, and providing power to one or more wake-up units determined to be operable in the standby mode and preventing power to be supplied to one or more wake-up units determined not to be operable in the standby mode when the standby mode is initiated.

The foregoing and/or other aspects and utilities of the present general inventive concept may also be achieve by providing a control method of a computer system, the method including performing a user-setting operation corresponding to a user setting of one or more wake-up units, and determining whether a standby mode condition exists, and if so, confirming a user setting of the one or more wake-up units, performing a system-setting operation corresponding to the user setting of the one or more wake-up units, setting a BIOS trap and a power supplying unit corresponding to the user settings of the one or more wake-up units, and entering a standby mode.

The foregoing and/or other aspects and utilities of the present general inventive concept may also be achieve by providing a computer readable medium containing computer readable codes to perform a method of reducing power consumption in a computer system, the method including performing a setting of at least one wake-up unit corresponding to operability of the at least one wake-up unit to detect a wake-up event in the standby mode; and controlling a power supplying unit to supply power to the at least one wake-up unit in the standby mode based on the performed setting to the at least one wake-up unit.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
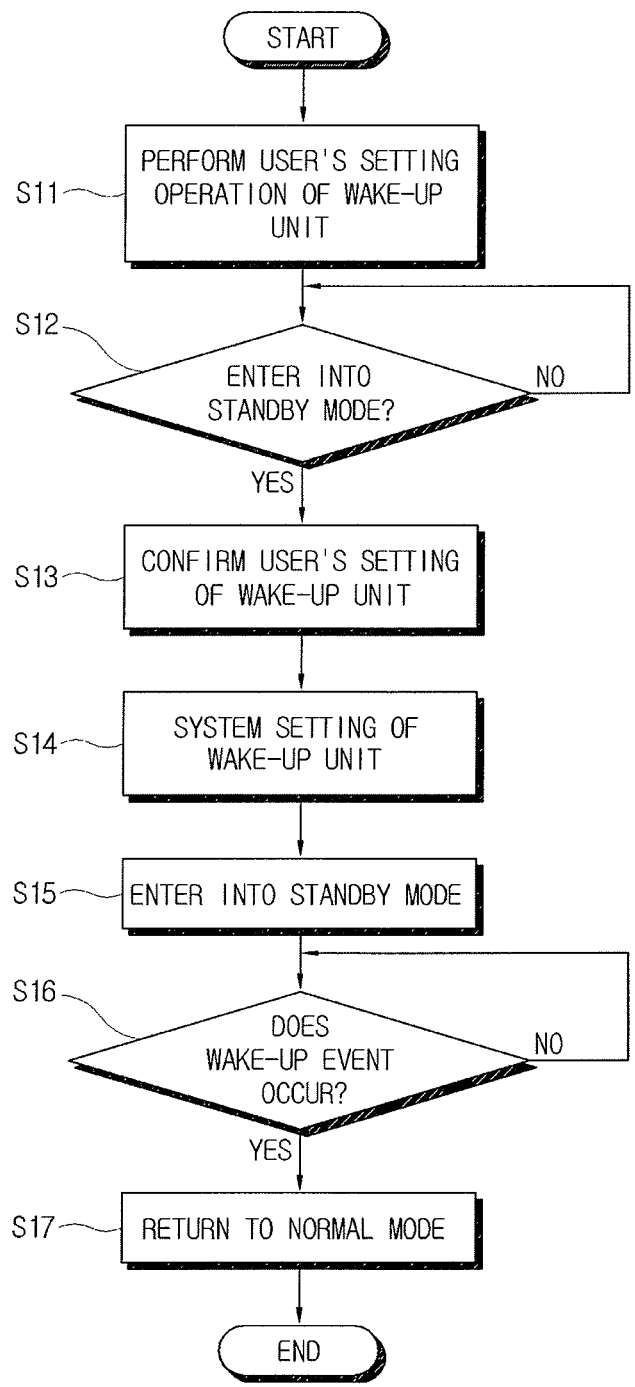
FIG. 1 is a flow diagram to illustrate standby mode setting and operation in a conventional computer system.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 2:
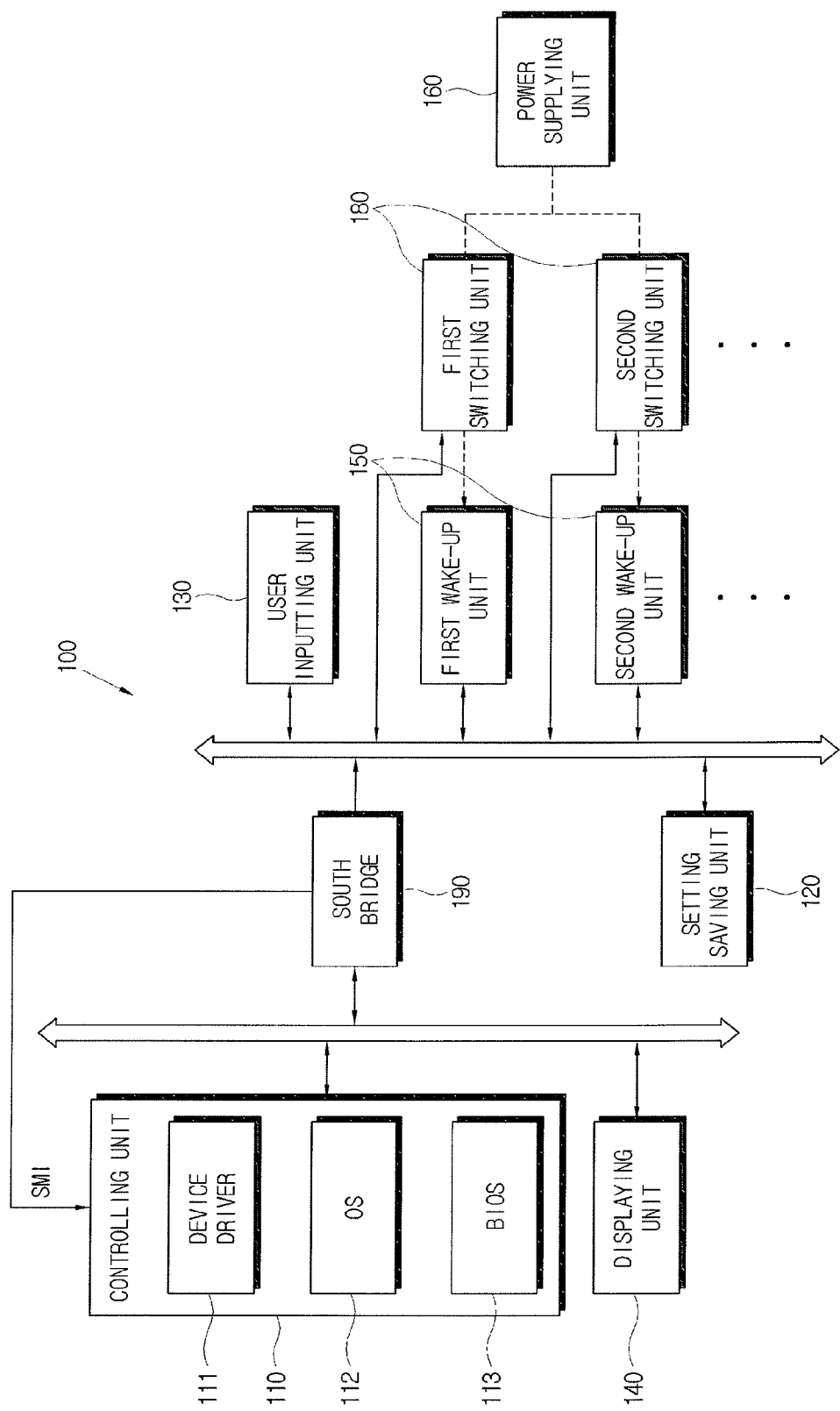
FIG. 2 is a block diagram illustrating a computer system according to an exemplary embodiment of the present general inventive concept.

FIG. 2 is a block diagram illustrating a computer system 100 according to an exemplary embodiment of the present general inventive concept. As illustrated in FIG. 2, the computer system 100 includes a plurality of wake-up units 150 (a first wake-up device and a second wake-up unit) to sense if a wake-up event occurs in a standby mode, a power supplying unit 160 to supply power to the wake-up units 150, and a controlling unit 110 to control power supply to the wake-up units 150 in the standby mode according to a predetermined setting as to whether the wake-up units 150 are operable in the standby mode. In FIG. 2, a dotted line indicates a stream of the power supply. For purposes of clarity, in the description below, only a power supply to the wake-up devices 150 is described, and a description of the power supply to other elements is omitted.

The wake-up units 150 monitor if the wake-up event occurs in the standby mode, and transmit a monitoring result to the controlling unit 110. The wake-up units 150 include a keyboard, a mouse, a network card, an audio card, a modem and other conventional devices.

As illustrated in FIG. 2, the controlling unit 110 includes an operating system (OS) 112 in charge of system management, a basic input/output system (BIOS) 113 providing a basic input/output interface of the system, and a central processing unit (CPU, not illustrated) operating the OS 112 and the BIOS 113.

The OS 112 performs a user setting operation corresponding to a user's setting of the wake-up units 150 in the standby mode. In an embodiment of the present general inventive concept, for the user's setting of the wake-up units 150, the computer system 100 may also include a user inputting unit 130 to receive and transmit the user's input, and a displaying unit 140 to display a user interface (UI) corresponding to the user's setting. The computer system 100 may also include a setting saving unit 120 to save setting information (hereinafter, also called "user setting information") of the wake-up units 150, which is, for example, set by the user. The user inputting unit 130 may be embodied by a keyboard and a mouse, and the setting saving unit 120 may be embodied by a hard disk drive.

Also, the OS 112 confirms whether the OS 112 should enter the standby mode. If the OS 112 enters the standby mode, the OS 112 refers to the user setting information to set whether to operate the wake-up units 150. The computer system 100 may also include a controller (not illustrated) of the wake-up units 150 such as a peripheral component interconnect (PCI) controller. A setting information (hereinafter, also called "system setting information") of the wake-up units 150, which is set by the OS 112, may be saved in a register (not illustrated) provided to the controller (not illustrated) of the wake-up units 150.

The BIOS 113 refers to the setting of the wake-up units 150 and sets whether to supply the power to the wake-up units 150 according to an actual operation of the wake-up units 150 before the system enters into the standby mode.

The computer system 100 may also include a plurality of switching units 180 (refer to a first switching unit and a second switching unit) which are provided to correspond to the plurality of wake-up units 150 and to switch to selectively supply the power from the power supplying unit 160 to a corresponding wake-up unit 150. The BIOS 113 controls operations of the plurality of switching units 180 to supply the power only to the wake-up unit 150 that is set to be actually operable in the standby mode.

As illustrated in FIG. 2, the computer system 100 further comprises a south bridge 190 to interface to the controlling unit 110, the wake-up units 150 and other units. The south bridge 190 generates an interrupt according to a BIOS trap setting before the system enters into the standby mode, thereby enabling the BIOS 113 to control the power supply of the wake-up units 150. The south bridge 190, for example, is an interrupt generating unit, in an embodiment of the present general inventive concept.

Figure 3:
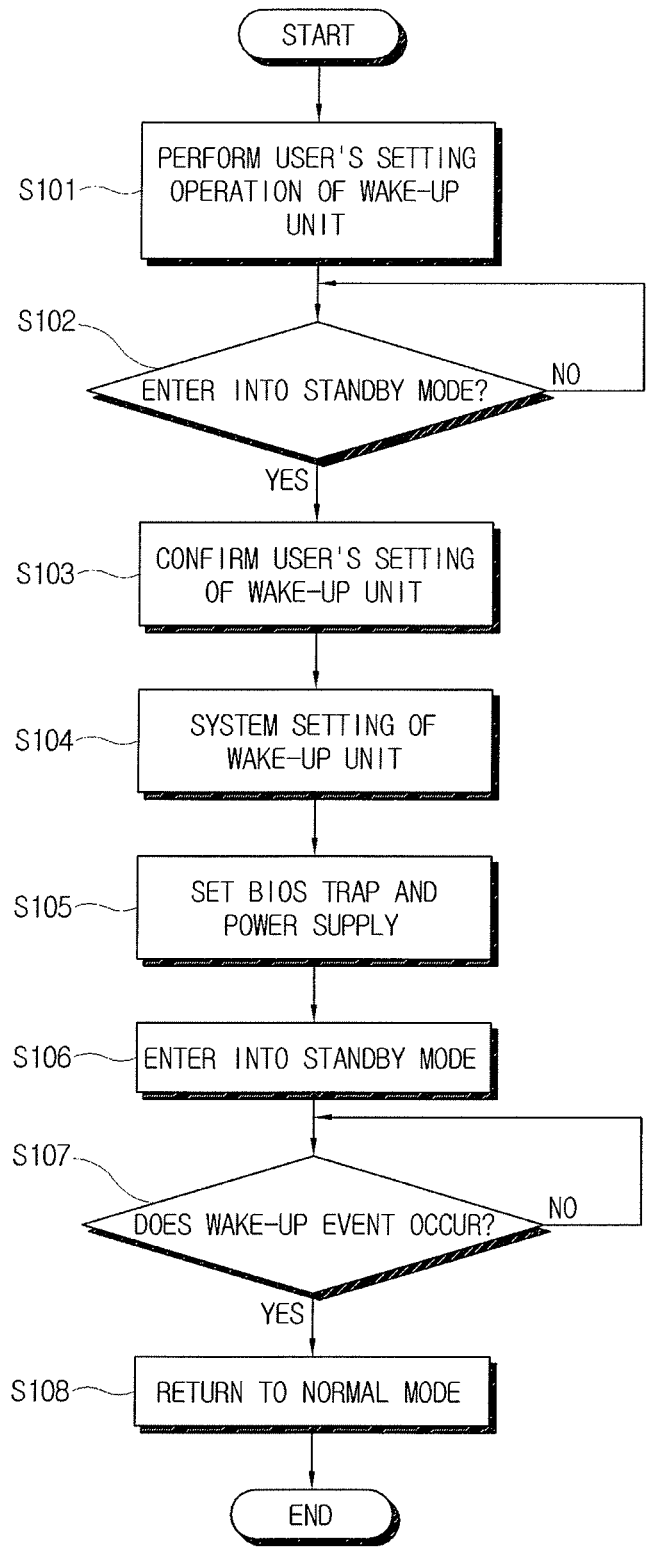
FIG. 3 is a flow diagram illustrating an operation of the computer system according to the exemplary embodiment of the present general inventive concept.

FIG. 3 is a flow diagram illustrating an operation of the computer system 100 according to an embodiment of the present general inventive concept. Referring to FIGS. 2 and 3, the OS 112 performs a user setting operation corresponding to a user setting of a wake-up unit 150 to operate in a standby mode at operation S101. The OS 112 confirms whether to satisfy a condition to enter into the standby mode while it normally performs an operation at operation S102. The condition to enter into the standby mode includes, for example, a user's command to enter into the standby mode, an elapse amount of time set by the user without any event occurring and/or other conventional conditions.

Referring to FIGS. 2 and 3, if the condition to enter into the standby mode is satisfied at operation S102, the OS 112 confirms the user's setting of the wake-up units 150, which is saved in the setting saving unit 120, at operation S103, and performs a system setting operation of the wake-up units 150 according to the user's setting at operation S104. In an embodiment of the present general inventive concept, the south bridge 190 may include a General Purpose Enable (GPE) register (not illustrated) and a General Purpose Status (GPS) register (not illustrated) which indicate if a wake-up monitoring is performed for each wake-up unit 150 according to an ACPI specification and indicate if the wake-up event occurs. The OS 112 performs the system setting, for example, by setting values of the GPE register and the GPS register.

In another embodiment of the present general inventive concept, the controlling unit 110 may be provided, for example, in a controller (not Illustrated) of the wake-up unit 150 such as a PCI controller. The controlling unit 110 may also include a device driver 111 to set values of a pair of registers (not illustrated) which may have functions similar to those of the GPE register and GPS register.

Referring to FIGS. 2 and 3, the south bridge 190 may include a sleep type register (not Illustrated) illustrating types of the standby mode according to an advanced configuration and a power interface (ACPI) specification and a sleep enable register (not illustrated) to indicate whether the standby mode is set. The OS 112 completes the operation of entering into the standby mode by recording the values corresponding to the standby mode in the sleep type register and the sleep enable register.

Figure 4:
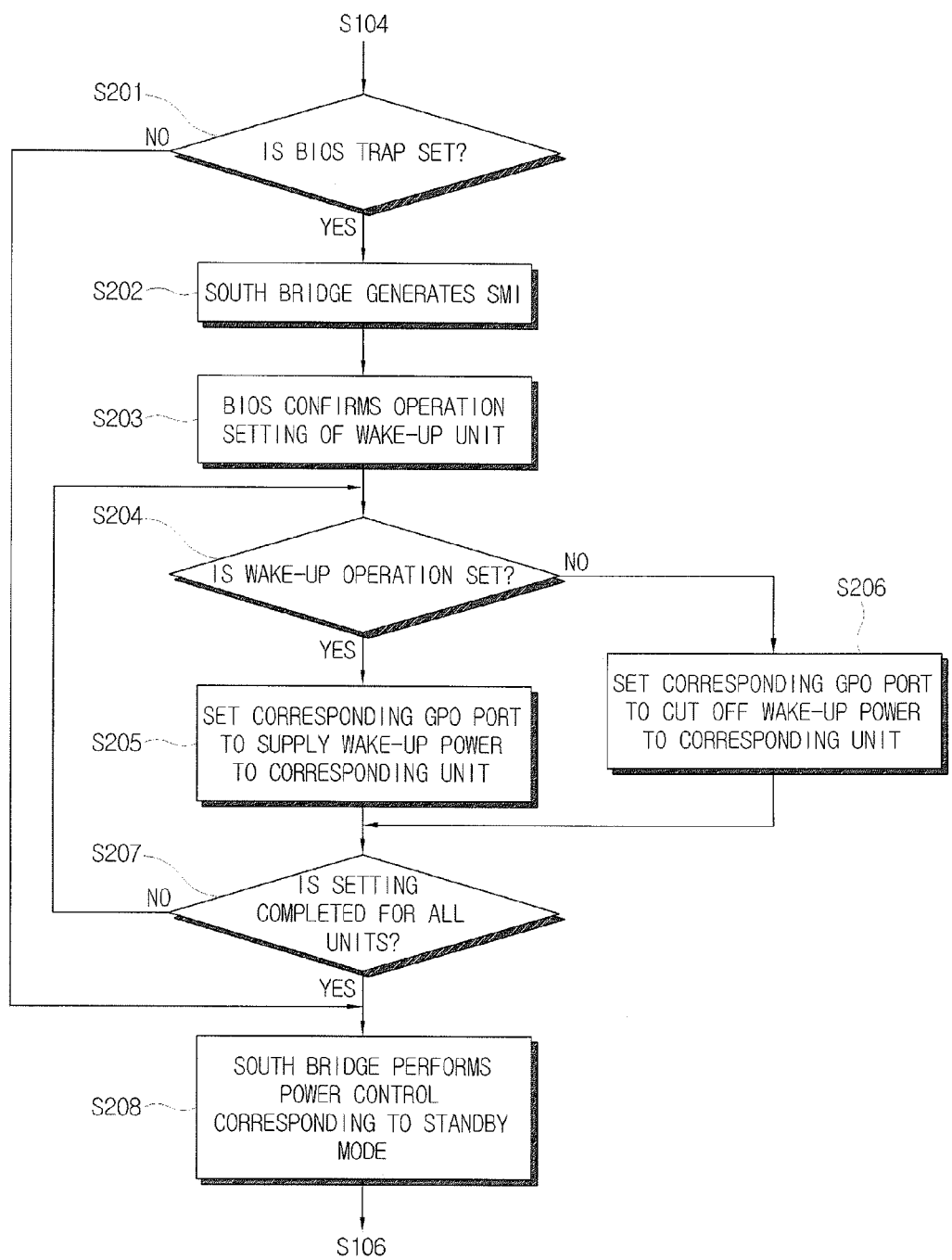
FIG. 4 is a flow diagram illustrating a process of operation S105 of FIG. 3.

Whether to supply the power to the wake-up unit 150 is set by the BIOS trap at operation S105 (FIG. 3). FIG. 4 is a flow diagram illustrating a process of operation S105 in this embodiment of the present general inventive concept. Referring to FIGS. 2 and 4, at operation S104, if the operation of the OS 112 entering into the standby mode is completed, the south bridge 190 confirms whether the BIOS trap is set at operation S201. The BIOS trap may be embodied by previously setting a corresponding register of the south bridge 190 by the BIOS 113 during a Power-On Self-Test (POST) when the system is booted.

At operation S201, if the BIOS trap is not set, operation S208 is performed. However, if the BIOS trap is set, the south bridge 190 generates a System Management Interrupt (SMI) according to the corresponding setting at operation S202. The CPU (controlling unit 110) executes a predetermined code of the BIOS 113 by the SMI generated at operation S202.

Accordingly, the BIOS 113 confirms the operation setting of each wake-up unit 150 in the standby mode at operation S203. The BIOS 113 confirms the GPE register and the GPS register of the south bridge 190 or confirms the pair of registers provided in the controller of the wake-up units 150, so that it can tell if each wake-up unit 150 is operable in the standby-mode.

With a result of confirmation at operation S203, if the corresponding wake-up unit 150 is set to be operable in the standby mode (Yes at operation S104), the BIOS 113 controls a corresponding switching unit 180 to supply a wake-up power to the corresponding wake-up unit 150 at operation S204. However, if the corresponding wake-up unit 150 is set not to be operable in the standby mode (No at operation S104), the BIOS 113 controls a corresponding switching unit 180 to cut off the wake-up power to the corresponding wake-up unit 150 at operation S205. In an embodiment of the present general inventive concept, the south bridge 190 may include a General Purpose Output (GPO) provided to correspond to each switching unit 180 to control the operation of the switching unit 180. The BIOS 113 can control the operation of the switching unit 180 by properly setting the value of the GPO corresponding to the wake-up unit 150.

Accordingly, whether the setting of the power supply is completed for all wake-up units 150 is confirmed at operation S207. If the setting of the power supply is not completed for all wake-up units 150, the process goes back to operation S204 and the setting of the power supply is performed for a next wake-up unit 150. If the setting of the power supply is completed for all wake-up units 150 at operation S207, the south bridge 190 performs the power control of the standby mode according to the values of the sleep type register and the sleep enable register, which is set by the OS 112, at operation S208.

By the power control of the south bridge 190 at operation S208, the system enters into the standby mode at operation S106, referring to FIG. 3, and each wake-up unit 150, while in the standby mode, monitors whether a given wake-up event occurs at operation S107. When the wake-up event occurs at operation S107, the wake-up unit 150 informs the south bridge 190 of the occurrence of the wake-up event. Accordingly, the south bridge 190 performs the power control corresponding to the normal mode, so that the OS 113 returns to a state that existed before the standby mode was entered into, and performs its normal operation at operation S108.

The present general inventive concept can also be embodied as computer-readable codes on a computer-readable medium. The computer-readable medium is any data storage device that can store data that can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, according to several embodiments of the present general inventive concept, a computer system and control method thereof that can minimize wasteful power consumption in a standby mode can be provided.

That is, the power can be saved in the standby mode by cutting off a power supply to a wake-up unit that is set not to monitor an occurrence of a wake-up event.

Although a few exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A computer system having a normal mode and a standby mode to decrease power consumption, the computer system comprising:
   at least one wake-up unit to sense if a wake-up event occurs in the standby mode;
   a power supplying unit to supply power to the at least one wake-up unit;
   a controlling unit to control the power supplying unit; and
   a user inputting unit operable to receive a user input to set whether the at least one wake-up unit is to be in an operable state in the standby mode,
   wherein, when the computer system transitions from the normal mode to the standby mode, the controlling unit is configured to control the power supplying unit to cut off power to the at least one wake-up unit if the at least one wake-up unit is set not to be in the operable state in the standby mode,
   wherein, if the at least one wake-up unit is set to be in the operable state in the standby mode, the power from the power supplying unit is supplied to the at least one wake-up unit to enable detection of whether the wake-up event occurs in the standby mode.

2. The computer system according to claim 1, wherein the controlling unit comprises:
   an operating system (OS) that performs an operation setting of the at least one wake-up unit of the standby mode according to an advanced configuration and power interface (ACPI) specification; and
   a basic input/output system (BIOS) which controls the power supply to the at least one wake-up unit according to the operation setting of the at least one wake-up unit which is performed by the OS.

3. The computer system according to claim 2, further comprising:
   a CPU where the OS and the BIOS are executed; and
   an interrupt generating unit which generates an interrupt to the CPU after the operation setting of the at least one wake-up unit performed by the OS,
   wherein the BIOS controls the power supply to the at least one wake-up unit if the interrupt is generated by the interrupt generating unit.

4. The computer system according to claim 1, further comprising:
   a switching unit to selectively switch the power from the power supplying unit to the at least one wake-up unit,
   wherein the controlling unit controls the power supplying unit to supply power to the at least one wake-up unit by controlling the switching unit.

5. A control method of a computer system comprising at least one wake-up unit to sense whether a wake-up event occurs in a standby mode, and a power supplying unit to supply power to the at least one wake-up unit, the method comprising:
   receiving a user input to set whether the at least one wake-up unit is to be in an operable state in the standby mode;
   when the computer system is in the standby mode, cutting off power supplied to the at least one wake-up unit if the at least one wake-up unit is set not be operable in the standby mode; and
   supplying power to the at least one wake-up unit to enable detection of whether the wake-up event occurs in the standby mode if the at least one wake-up unit is set to be in the operable state in the standby mode.

6. The method according to claim 5, further comprising:
   performing an operation setting of the at least one wake-up unit according to an advanced configuration and power interface (ACPI) specification; and
   generating an interrupt after the performed operation setting of the at least one wake-up unit,
   wherein the controlling the power supplying unit is performed when the interrupt is generated.

7. A computer apparatus comprising:
   a wake-up unit to detect whether a wake-up event occurs in a standby mode;
   a user inputting unit operable to receive a user input to set whether the wake-up unit is to be in an operable state in the standby mode; and
   a controlling unit to control the power supplying unit to supply power to the at least one wake-up unit in the standby mode based on whether the wake-up unit is set to be in the operable state in the standby mode,
   wherein, in the standby mode, the controlling unit is configured to cut off the power supplied from the power supplying unit to the wake-up unit if the wake-up unit is set not be operable in the standby mode.

8. The apparatus according to claim 7, further comprising:
   a switching unit to selectively switch the power from the power supplying unit to the at least one wake-up unit, wherein the controlling unit controls the power supplying unit by controlling the switching unit.

* * * * *